(12) United States Patent
Koborita et al.

(10) Patent No.: US 9,420,204 B2
(45) Date of Patent: Aug. 16, 2016

(54) INFORMATION PROCESSING APPARATUS, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventors: Ryoko Koborita, Kanagawa (JP); Toru Fuse, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 3 days.

(21) Appl. No.: 14/259,988

(22) Filed: Apr. 23, 2014

(65) Prior Publication Data

US 2015/0092007 A1 Apr. 2, 2015

(30) Foreign Application Priority Data

Oct. 2, 2013 (JP) .................................. 2013-207739

(51) Int. Cl.
| | |
|---|---|
| H04N 7/15 | (2006.01) |
| H04N 5/278 | (2006.01) |
| G06K 9/00 | (2006.01) |

(52) U.S. Cl.
CPC ............ *H04N 5/278* (2013.01); *G06K 9/00342* (2013.01); *G06K 9/00711* (2013.01); *H04N 7/15* (2013.01)

(58) Field of Classification Search
CPC ............... G10L 21/00; H04N 21/4307; H04N 21/44008
USPC ...................................................... 348/14.07
See application file for complete search history.

(56) References Cited

U.S. PATENT DOCUMENTS

| | | | | |
|---|---|---|---|---|
| 8,130,257 B2 * | 3/2012 | Cutler | ............... | H04N 5/23219 348/14.12 |
| 8,307,399 B2 * | 11/2012 | Lee | ..................... | H04N 7/17318 715/720 |
| 8,913,744 B2 * | 12/2014 | Abe | ................... | G06F 17/30787 380/252 |
| 2005/0018861 A1 * | 1/2005 | Tashev | .................... | H04R 1/406 381/92 |
| 2011/0317984 A1 * | 12/2011 | Masutani | ...................... | 386/285 |
| 2012/0128242 A1 * | 5/2012 | Hampapur | ............. | H04N 5/147 382/165 |
| 2013/0282376 A1 | 10/2013 | Nonaka | | |
| 2013/0283157 A1 | 10/2013 | Ebata | | |
| 2013/0304457 A1 * | 11/2013 | Kang et al. | ..................... | 704/201 |
| 2014/0298153 A1 * | 10/2014 | Tsujimoto et al. | ............ | 715/232 |

FOREIGN PATENT DOCUMENTS

| | | |
|---|---|---|
| JP | 2003-123084 A | 4/2003 |
| JP | 2007-004677 A | 1/2007 |
| JP | 2012-133659 A | 7/2012 |
| JP | 2012-133660 A | 7/2012 |
| JP | 2012-133662 A | 7/2012 |

* cited by examiner

*Primary Examiner* — Creighton Smith
(74) *Attorney, Agent, or Firm* — Sughrue Mion, PLLC

(57) ABSTRACT

An information processing apparatus includes a frame selection unit that selects a characteristic frame from image data representing one or a plurality of objects and including a plurality of frames, an object selection unit that selects a characteristic object from the one or the plurality of objects, a textual information generation unit that generates textual information that indicates at least one of a movement of the characteristic object and a sound from the characteristic object, and a display controller that displays an image of the characteristic frame with the textual information associated with the characteristic object.

23 Claims, 8 Drawing Sheets

FIG. 3

| OPERATION | EXAMPLE OF DEVICE | EXAMPLE OF METADATA |
|---|---|---|
| KEY INPUT | KEYBOARD | INPUT OF COMMENTS OR NOTES |
| OPERATION DETECTION | INFRARED CAMERA | LOCATION OF PERSON, MOTION OF PERSON, LOCATION OF OBJECT, MOTION OF OBJECT, REPLACEMENT OF VELLUM (MODIFICATION OF LAYOUT) |
| STROKE DETECTION | DIGITAL PEN | WRITING OR REWRITING OF NOTEPAD OR TAG LABEL |
| SENSOR | MICRO SWITCH, ACCELERATION SENSOR, RANGE FINDER | POWER ON/OFF OF PROJECTOR, SHIFTING OF WHITEBOARD (SCROLLING) |

FIG. 4

| TIME | DEVICE | INPUT OPERATOR | METADATA |
|---|---|---|---|
| 14:03:50 | PROJECTOR | - | ON |
| 14:04:02 | DIGITAL PEN | A | …217, 312, 218, 314, 219, 315,…(COORDINATES INFORMATION) |
| 14:04:08 | KEYBOARD | B | SUBJECT 1 |
| 14:04:30 | KEYBOARD | B | SUMMER POWER SAVING PLAN |

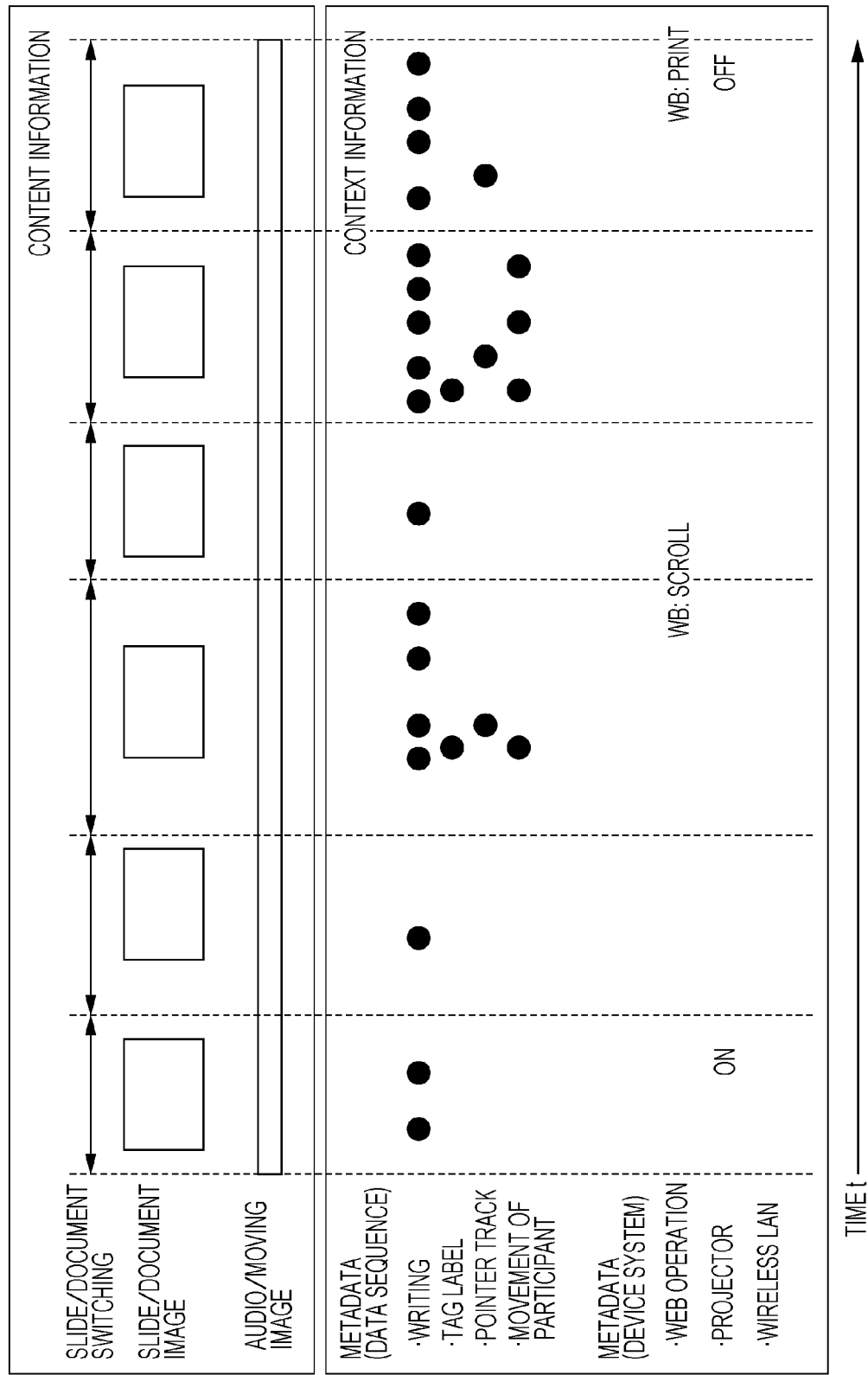

FIG. 6A

| | |A| | |B| | |C| | |D| | |A∩B| | |A∩C| | |A∩D| | |B∩C| | |B∩D| | |C∩D| | |A∪B| | |A∪C| | |A∪D| | |B∪C| | |B∪D| | |C∪D| |
|---|---|---|---|---|---|---|---|---|---|---|---|---|---|---|---|---|
| A | 1 | 1 | 0 | 1 | 3 | | | | | | | | | | | |
| B | 1 | 0 | 0 | 1 | 2 | | | | | | | | | | | |
| C | 0 | 1 | 0 | 0 | 1 | | | | | | | | | | | |
| D | 1 | 1 | 1 | 1 | 4 | 2 | 1 | 3 | 0 | 2 | 1 | 3 | 3 | 4 | 3 | 4 | 4 |

CONTENT: A
CONTEXT: B, C, D

FIG. 6B

| | SIMPSON'S COEFFICIENT | SIMPSON'S COEFFICIENT WITH THRESHOLD K=1 | JACCARD'S COEFFICIENT |
|---|---|---|---|
| A, B | 2/3 | 2/3 | 2/3 |
| A, C | 1 | 0 | 1/3 |
| A, D | 1 | 1 | 3/4 |
| B, C | 0 | 0 | 0 |
| B, D | 2/3 | 2/3 | 1/2 |
| C, D | 1 | 0 | 1/4 |

KEY CONTEXT IS D

JACCARD'S COEFFICIENT: $|X \cap Y|/|X \cup Y|$

SIMPSON'S COEFFICIENT: $|X \cap Y|/\min(|X|, |Y|)$

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-207739 filed Oct. 2, 2013.

BACKGROUND

Technical Field

The present invention relates to an information processing apparatus, an information processing method, and a non-transitory computer readable medium.

SUMMARY

According to an aspect of the invention, there is provided an information processing apparatus including a frame selection unit that selects a characteristic frame from image data representing one or a plurality of objects and including a plurality of frames, an object selection unit that selects a characteristic object from the one or the plurality of objects, a textual information generation unit that generates textual information that indicates at least one of a movement of the characteristic object and a sound from the characteristic object, and a display controller that displays an image of the characteristic frame with the textual information associated with the characteristic object.

BRIEF DESCRIPTION OF THE DRAWINGS

Exemplary embodiments of the present invention will be described in detail based on the following figures, wherein:

FIG. 3 illustrates an example of context information;

FIG. 4 illustrates another example of the context information;

FIG. 5 illustrates an example of content information and context information;

FIGS. 6A and 6B illustrate a co-occurrence relationship between the content information and context information;

DETAILED DESCRIPTION

Figure 1:
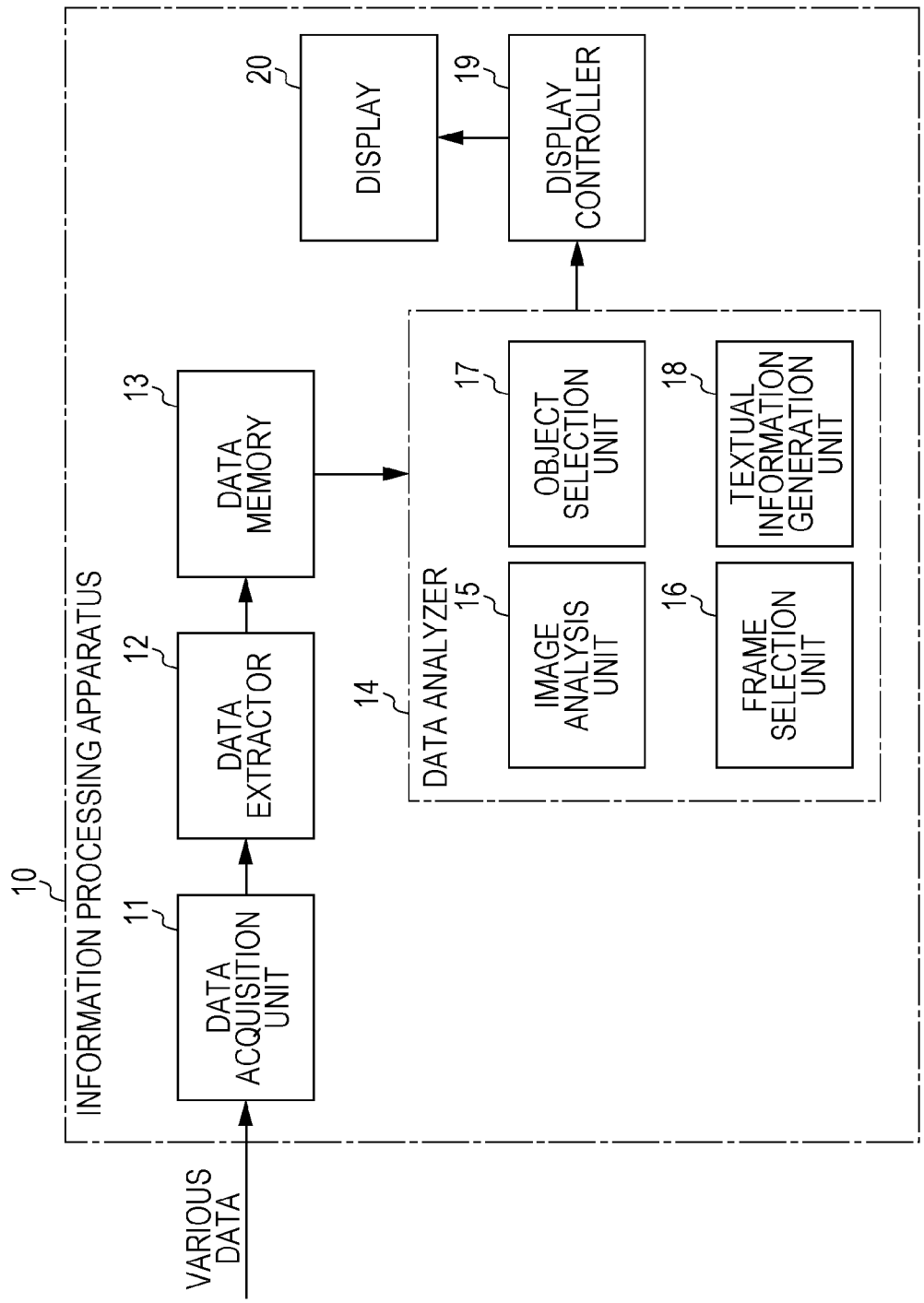
FIG. 1 illustrates an example of an information processing apparatus of an exemplary embodiment of the present invention.

FIG. 1 illustrates an example of an information processing apparatus of an exemplary embodiment of the present invention. The information processing apparatus 10 of the exemplary embodiment associates text information representing a movement or a sound of an object represented by image data with the object. The object herein refers to a person and a thing.

Figure 2:
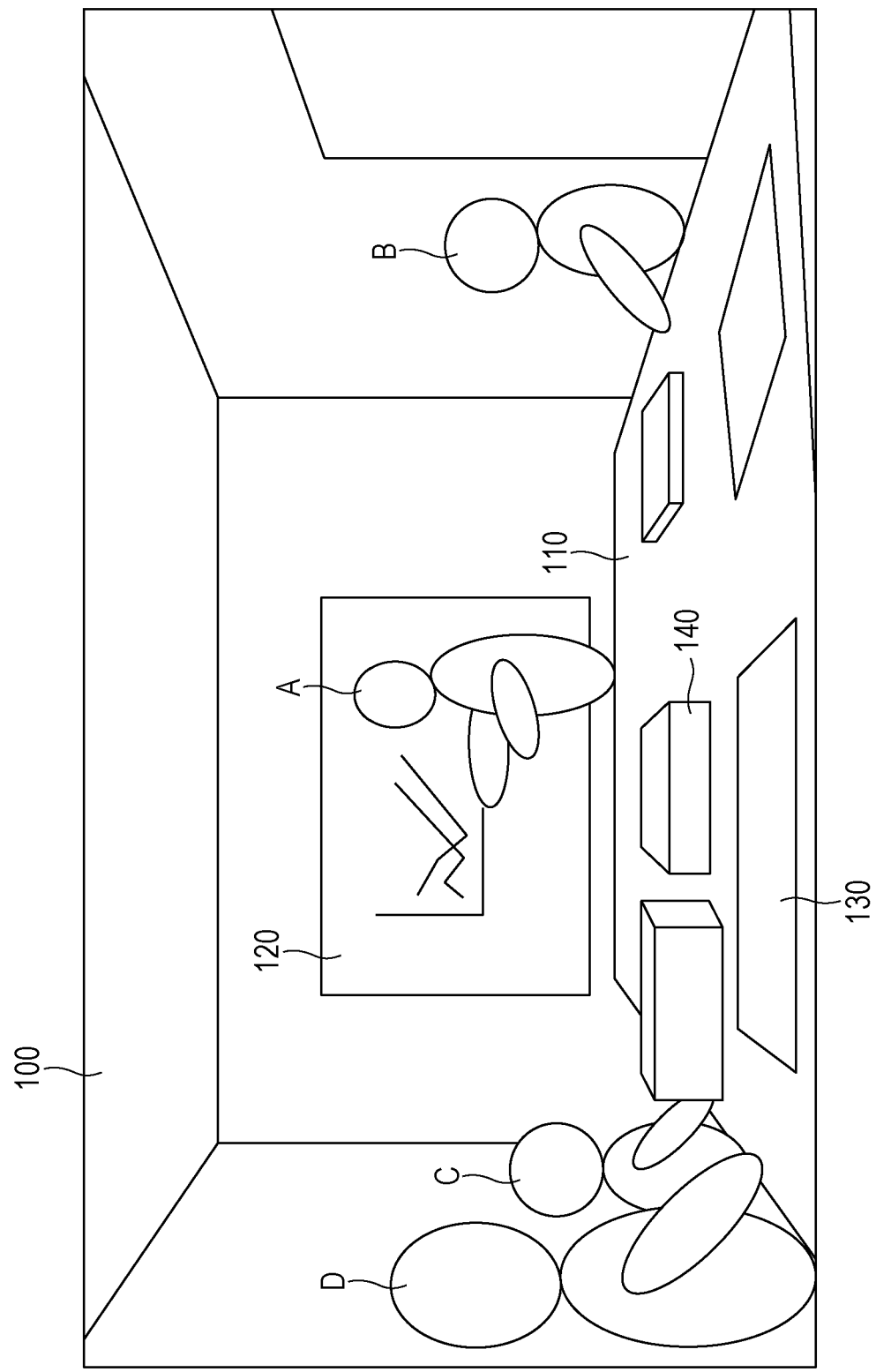
FIG. 2 is an inside view of an example of a meeting room.

In one example described below, a meeting room is a target location, and the textual information is associated with a person or a thing in the meeting room. For example, as illustrated in FIG. 2, multiple persons (including participants A, B, C, and D) gather and have a meeting in a meeting room 100. The meeting room 100 is furnished with a table 110, a whiteboard 120, and the like. Vellum may be pasted in the meeting room 100. Placed on the table 110 are material 130, a personal computer 140, a projector, and the like. In the example of FIG. 2, the participants A through D, the table 110, the whiteboard 120, the material 130, and the personal computer 140 are examples of object. A single person or multiple persons may write information on the whiteboard 120 or the vellum. A tag label or a note pad is available for an individual to write information on. A variety of movements occur in the meeting. For example, participants talk, raise their hands, write something on the whiteboard 120, move within the meeting room 100, use the projector to project an image on the whiteboard 120, stick a tag label or a note pad onto the whiteboard 120 or the vellum, replace the tag or the note pad, switch on/off the projector, change images projected by the projector, open or close the door, and scroll the whiteboard 120. These movements are typically accompanied with sounds. The information processing apparatus 10 associates information indicating the movements and sounds of the persons and things in the meeting room 100 as the textual information with the persons and things. A specific configuration of the information processing apparatus 10 is described below.

The information processing apparatus 10 includes a data acquisition unit 11, a data extractor 12, a data memory 13, a data analyzer 14, a display controller 19, and a display 20. The data analyzer 14 includes an image analysis unit 15, a frame selection unit 16, an object selection unit 17, and a textual information generation unit 18.

The data acquisition unit 11 acquires content information and context information, and causes the data memory 13 to store the content information and context information. For example, the content information includes moving image data (image data including multiple frames), audio data, and image data (data of slide or document) projected on the whiteboard 120 by the projector. For example, the moving image data representing the inside view of the meeting room 100 is generated when an imaging apparatus photographs the inside of the meeting room 100 of FIG. 2. The data acquisition unit 11 then acquires the moving image data. The audio data is generated when a recording apparatus picks up the sound generated within the meeting room 100, and the data acquisition unit 11 then acquires the audio data. If a directional microphone is used, the audio data representing a sound generated in a particular direction is generated. The data acquisition unit 11 then acquires the directional audio data. For example, if a directional microphone is used, the sound generated by each object is detected. The data acquisition unit 11 thus acquires the audio data indicating the sound generated by each object. The moving image data represents the movement of the person and the movement of the thing in the meeting room 100. The audio data has a record of a speech of a person in the meeting room 100 and a sound generated by a thing in the meeting room 100. The data acquisition unit 11 acquires the image data, projected by the projector, via the projector and an apparatus, such as a personal computer, connected to the projector. The content information, such as the moving image data, the audio data, and the image data, includes time information indicating time and date on which image capturing and sound recording are performed. The content information is accompanied by device identification information identifying a device that has acquired the content information, and user identification information identifying the user of the device.

The context information is acquired or detected by a variety of devices. The devices include an input device, a movement detection device, and a variety of sensors. Using the variety of devices, the context information related to the movement and sound generated in the meeting room 100 is acquired or detected. The input devices allow a person to input information, and include a keyboard, a mouse and a digital pen. The movement detection device detects the movement of the person and the thing. For example, the movement detection device is an infrared camera, such as Kinect (registered trademark). A variety of sensors includes a micro switch, an acceleration sensor, and a range finder. The context information includes time information representing time and date on which the context information has been acquired or detected by the variety of devices. The context information includes device identification information identifying a device that has acquired or detected the context information, and user identification information identifying the user of the device.

The data extractor 12 extracts metadata from the context information, associates the metadata with the time information identifying time and date on which the context information has been acquired or detected, and then causes the data memory 13 to store the metadata.

FIG. 3 illustrates an example of the metadata. The user may perform key input using an input device, such as a keyboard. Information, such as a comment or a note corresponding to the key input, is the context information. The data extractor 12 extracts as the metadata the information such as the comment or the note, associates the information, such as the comment or the note, with time information representing time and date on which the comment or the note has been input, and then causes the data memory 13 to store the metadata. The data extractor 12 may associate the user identification information identifying the user of the input device with the metadata.

If an infrared camera is used as the movement detection device, the location and movement of a person, and the location and movement of a thing in the meeting room 100 correspond to the context information. For example, the infrared camera detects the movements of the person, including the walk of the person, hand raising of the person, the writing on the whiteboard 120 in the meeting room 100, the sticking of the tag label, the replacement of the tag label, and the replacement of the vellum (layout modification) in the meeting room 100. The infrared camera may also detect the movement of the things, including the opening and closing of the doors of the meeting room 100, the movement of a document, and the shifting of the personal computer. The data extractor 12 extracts as the metadata the information representing the location and movement of the person, and the location and movement of the thing, associates the time information, indicating time and date on which these pieces of information have been detected by the infrared camera, with the metadata, and causes the data memory 13 to store the metadata.

If the user inputs the information using a digital pen, information representing written or rewritten contents on the tag label or the note pad corresponds to the context information. The data extractor 12 extracts the information input using the digital pen as the metadata, associates time information indicating time and date on which the information has been input by the digital pen with the metadata, and causes the data memory 13 to store the metadata. The data extractor 12 may associate user identification information identifying the user of the digital pen with the metadata.

If a variety of sensors detects power on/off of the projector installed in the meeting room 100, information indicating the power on/off corresponds to the context information. The data extractor 12 extracts the information indicating the power on/off as the metadata, associates time information indicating time and date of the power on/off with the metadata, and causes the data memory 13 to store the metadata. The whiteboard 120 installed in the meeting room 100 may be scrolled, and that scroll operation may be detected by a sensor. Information indicating the scroll operation corresponds to the context information. The data extractor 12 extracts the information indicating the scroll operation as the metadata, associates time information indicating time and date on which the scroll operation has been performed with the metadata, and stores the metadata on the data memory 13.

FIG. 4 illustrates an example of the extracted metadata. As illustrated in FIG. 4, the metadata is associated with time at which the context information has been acquired or detected, a name of a device that has acquired or detected the context information (device identification information), and a user of the device (user identification information). For example, first metadata in the list of FIG. 4 indicates that the projector is powered on at time 14:03:50. Second metadata indicates that participant A uses the digital pen at time 14:04:02. The metadata indicates a track of the digital pen writing (coordinates information). If information is input by a keyboard, the metadata indicates the information input by the keyboard (such as "Subject 1" or "Summer power saving plan").

FIG. 5 illustrates an example of the content information and context information acquired along time sequence. In FIG. 5, the abscissa represents time. The projector projects an image of a slide or a document, thus, multiple images are switched along the time sequence. Recorded herein are the moving image data representing the inside of the meeting room 100 and the audio data representing the sound generated in the meeting room 100. The moving image data represents an image projected by the projector, the whiteboard 120, and the participants A through D of the meeting. The data acquisition unit 11 acquires, as the content information, the image data of the slide or the document, the moving image data and the audio data, and causes the data memory 13 to store the content information. The movement detection sensor, such as an infrared sensor, detects the writing on the whiteboard 120, the sticking of the tag label, the track of a pointer, and the movement of the participants A through D of the meeting, and the data acquisition unit 11 acquires as the content information the data detected by the movement detection sensor, and causes the data memory 13 to store the content information. The variety of sensors detects the operation of the whiteboard (WB) 120, the power on/off of the projector, and the power on/off of the wireless LAN. The data acquisition unit 11 acquires the data detected by the variety of sensors as the content information, and causes the data memory 13 to store the content information.

Described with reference back to FIG. 1 are the image analysis unit 15, the frame selection unit 16, the object selection unit 17, the textual information generation unit 18, the display controller 19, and the display 20.

The image analysis unit 15 identifies a region of interest (ROI) represented by the moving image data in accordance with the detection results of the infrared camera. For example, the image analysis unit 15 identifies, as the ROI, an object (a person or a thing) represented by the moving image data. The image analysis unit 15 also identifies a moving region in the moving image data as the ROI. Using related art techniques, the image analysis unit 15 may recognize each object represented by the moving image data and identifies the type of the object. In accordance with the directional audio data and the moving image data, the image analysis unit 15 associates each object represented by the moving image data with the audio data indicating the sound from each object.

The frame selection unit 16 selects a characteristic frame from the moving image data including multiple frames. The characteristic frame corresponds to a representative image of the moving image data. For example, the frame selection unit 16 selects the characteristic frame from multiple frames in accordance with the movement of the object (a person or a thing) represented by the moving image data and the sound generated by the object.

The object selection unit 17 selects one or more characteristic objects from one or more objects represented by the moving image data. The textual information is associated with the characteristic object. For example, the object selection unit 17 selects one or more characteristic objects from one or more objects in accordance with movements of objects (a person or a thing) represented by the moving image data and sounds generated by the objects. The object selection unit 17 selects as a movement and sound of another characteristic object a movement and sound of the other characteristic object related to the movement and sound of the characteristic object. The object selection unit 17 may select the context information related to the content information. For example, the object selection unit 17 selects the context information related to the content information indicating the movement and sound of the characteristic object. More specifically, the object selection unit 17 selects the context information having a co-occurrence relationship with the content information.

Using the content information and context information, the textual information generation unit 18 generates the textual information indicating at least one of the movement of the characteristic object and the sound generated by the characteristic object, and associates the textual information with the characteristic object. The textual information generation unit 18 may generate a summary of the textual information or may highlight a particular word or character string included in the textual information. For example, the textual information generation unit 18 may highlight a word or character string that occurs repeatedly, or a word or character string with intonation in the audio data.

The textual information generation unit 18 generates the textual information indicating talk contents of a person in accordance with the audio data. The textual information generation unit 18 generates the textual information indicating information input by the input device. In response to the audio data, the textual information generation unit 18 may generate the textual information indicating a direct sound of a ring tone of a portable terminal apparatus, such as a cell phone or a smart phone, or an indirect sound, such as a sound of a closing door or an opening door, and onomatopoeic sounds. The textual information generation unit 18 may generate the textual information representing the progress of a meeting based on analysis results of the image analysis unit 15, and detection results of the infrared camera. The textual information generation unit 18 may acquire background information indicating time and date and a venue of the meeting and then generate the textual information related to the background information. The background information is information input via the input device, for example.

In order to generate the textual information representing the sound generated by the characteristic object, the textual information generation unit 18 generates the textual information indicating the sound of the characteristic object based on the directional audio data. Since the audio data is directional and associates each piece of audio data with each object, the textual information generation unit 18 generates the textual information representing the sound of the characteristic object based on the audio data associated with the characteristic object. More specifically, a participant of the meeting may talk, and the contents of the talk may be recorded. The textual information generation unit 18 then generates the textual information representing the contents of the talk based on the audio data, and associates the textual information with the participant who talks. If the audio data does not contain a sound having a sound level equal to or above a threshold value, the textual information generation unit 18 may the textual information indicating such a condition (for example, a character string of "silence").

Identification information that identifies the movement of the object may be associated beforehand with the textual information that represents movement contents in character string (for example, a character string symbolically expressing the movement contents). The textual information generation unit 18 may generate the textual information indicating the movement of the characteristic object represented by the moving image data, based on the association information. Information indicating the association between the identification information indicating the movement contents and the textual information is stored beforehand on a memory (not illustrated). The textual information generation unit 18 associates the textual information indicating the movement of the characteristic object with the characteristic object. More specifically, a person may "promptly" write characters or draw a picture on the whiteboard 120, and the identification information indicating such a movement may be associated with the textual information (a character string "promptly"). Information indicating the association is stored beforehand on the memory (not illustrated). If the infrared camera or the image analysis unit 15 detects the movement of character writing or picture drawing, the textual information generation unit 18 generates the textual information including the character string "promptly" as the textual information indicating the movement. Paper sheets or a document may be placed on a desk as an object with a "thump". The identification information is associated with the textual information (a character string "thump") indicating the movement. The information indicating the association is stored beforehand on the memory (not illustrated). If the infrared camera or the image analysis unit 15 detects the movement of placing the paper sheets or the document on the desk, the textual information generation unit 18 generates the textual information including the character string "thump" as the textual information indicating the movement. The door as an object may be closed with a "bang", for example. The identification information indicating the movement is associated with the textual information (a character string "bang"), and information indicating the association is stored beforehand on the memory. If the infrared camera or the image analysis unit 15 detects the movement of closing the door, the textual information generation unit 18 generates the textual information including the character string "bang" as the textual information indicating the movement.

The display controller 19 causes the display 20 to display an image of the characteristic frame. The display controller 19 also displays the textual information of the characteristic object on the image of the characteristic frame with the characteristic object associated with the textual information. For example, a balloon is displayed in a region that is close to the characteristic object and external to a region having an object displayed in the image of the characteristic frame, and the textual information associated with the characteristic object is displayed in the balloon. The display controller 19 may change the size, shape, and number of balloons in response to the size of a region where the balloons are displayed. The size of the character string included in the textual information may be changed. The display controller 19 may change the display mode of the textual information in response to the type of the characteristic object and the type of the sound. For example, the display controller 19 may change the display mode by changing the shape of the balloon depending on whether the textual information indicates the talk contents of the person or the sound generated by the thing. The display controller 19 may display the textual information on the image without displaying the balloon if the textual information indicates the sound generated by the thing or indicates the movement of the person or the thing. The display controller 19 may change the display target of the textual information depending on whether the sound is a direct sound to an indirect sound. In response to the size of the image of the display 20, the display controller 19 may restrict the number of characters contained in the textual information or may adjust the size of the characters.

The processes of the frame selection unit 16, the object selection unit 17, the textual information generation unit 18, and the display controller 19 (first through sixth exemplary embodiments) are described below.

First Exemplary Embodiment

A first exemplary embodiment is described below. In the first exemplary embodiment, the frame selection unit 16 counts the number of consecutive movements of an object (consecutive movement count) in accordance with the moving image data, identifies a period (target period) throughout which the consecutive movement count is equal to or above a threshold movement count, and selects as a characteristic frame a frame within the target period. The frame selection unit 16 detects the count of movements of each object based on the detection results of the infrared camera and the analysis results of the image analysis unit 15. The "consecutive movements" refer to a series of movements that are performed at intervals of a predetermined length or shorter. A participant of the meeting may now continually write characters or draw a picture. The frame selection unit 16 selects as the characteristic frame a frame within the target period during which the count of writing movements is equal to or above the threshold movement count. If multiple participants move concurrently, the frame selection unit 16 detects the movement of each participant, and selects the characteristic frame based on the detection results. The frame selection unit 16 may select as the characteristic frame the first frame during the target period, or may select as the characteristic frame the last frame during the target period, or may select as the characteristic frame the intermediate frame during the target period, or may select as the characteristic frame a frame at any time point during the target period. The user may use an operation unit (not illustrated) to select as the characteristic frame a frame at any time point during the target period. If the consecutive movement count is equal to or higher than the threshold movement count, there is a possibility that active discussions are held in the meeting. The image of the frame during the target period may be a representative image appropriately representing the atmosphere of the meeting. The frame selection unit 16 thus selects the characteristic frame based on the movement count of the participant.

The object selection unit 17 selects as the characteristic object an object (a participant of the meeting) having a consecutive movement count during the target period equal to or above the threshold movement count value. Since the consecutive movement count equal to or above the threshold movement count is interpreted to mean that the contents of the movements are of greater value, the object selection unit 17 selects as the characteristic object the participant who has performed that movement.

In accordance with the first exemplary embodiment, the frame selection unit 16 selects as the characteristic frame the frame within the target period throughout which the consecutive movement count of the object is equal to or above the threshold movement count, and the object selection unit 17 selects as the characteristic object the object having the consecutive movement count within the target period equal to or above the threshold movement count.

The textual information generation unit 18 generates the textual information indicating the contents of the movement of the characteristic object during the target period, based on the association between the contents of movement of the object and the textual information representing the contents of the movement. For example, a person as a characteristic object may now write a character or the like on the whiteboard 120. The textual information generation unit 18 generates the textual information corresponding to the writing operation (the character string "promptly"), and then associates the textual information with the characteristic object. The textual information generation unit 18 may generate the textual information representing the contents of the talk, based on the audio data representing the contents of the talk of the characteristic object during the target period. The textual information generation unit 18 may generate a summary of the textual information. The textual information generation unit 18 may express a word or character string that occurs repeatedly, or a word or character string with intonation, in red color, a large font, or a bold font.

The object selection unit 17 may select the movement and sound of the characteristic object as the movement and sound of each object within the target period. For example, the object selection unit 17 may select the contents of the movement and the contents of the talk of each participant within the target period as the contents of the movement and the contents of the talk of the characteristic object and the textual information generation unit 18 may generate the textual information indicating the contents of the movement and the contents of the talk. The object selection unit 17 may select the movement and sound of another thing during the target period as the movement and sound of the characteristic object, and the textual information generation unit 18 may generate the textual information indicating the movement and sound. More specifically, the paper sheets or the document may be placed on the desk during the target period. The object selection unit 17 may select the movement of the paper sheets as the movement of the characteristic object, and the textual information generation unit 18 may generate the textual information indicating the contents of the movement (such as the character string "thump"). For example, the door may now be closed during the target period. The object selection unit 17 selects the movement of the door as the movement of the characteristic object, and the textual information generation unit 18 generates the textual information indicating the contents of the movement (such as the character string "bang"). Since there is a possibility that the contents of the talk of each participant during the target period are highly related with the contents of the movement of the characteristic object, the textual information related to the contents of the talk of each participant is also generated.

The display controller 19 causes the display 20 to display an image of the characteristic frame (representative image) and to display the textual information associated with each object on the representative image.

As described above, the representative image appropriately representing the atmosphere in the meeting room as an imaging target is selected by selecting the characteristic frame based on the movement count of the object. The information representing the movement of greater value is displayed on the representative image by selecting the characteristic object based on the movement count of each object, by generating the textual information representing the movement, and by displaying the textual information on the representative image. The mutually related information is displayed on the representative image by generating the textual information related to the movement and sound of each object during the target period and by displaying the textual information on the representative image.

In the first exemplary embodiment, the representative image appropriately representing the atmosphere of the meeting room is selected, and the textual information representing the contents of the movement of the characteristic object is displayed on the representative image. By referencing the representative image, the user may easily learn the movement of the characteristic object during the meeting. Since the information related to the contents of the talks of each participant, and the movement and sound of each participant and each thing occurring during the meeting is displayed on the representative image, the user may easily learn the contents of the talks of each participant, and the movement and sound of each participant occurring during the meeting. Without reproducing the moving image data from start to end, the user may easily learn events occurring during the meeting by simply referencing the representative image. Even if a user failed to participate a meeting, the user may learn the contents of the movement and the contents of the talk of each participant later by referencing the representative image.

Second Exemplary Embodiment

A second exemplary embodiment is described below. In the second exemplary embodiment, the frame selection unit 16 measures from the moving image data a length of time (continuous movement time) throughout which an object (a participant of the meeting) continually moves, determines a period (target period) in which the continuous movement time becomes equal to or above a predetermined threshold movement time length, and selects a frame within the target period as the characteristic frame. The "continuous movement" refers to a series of movements that are performed at intervals of a predetermined length or shorter, but does not necessarily mean a series of movements that are performed with no intervals interposed therebetween. A participant of the meeting may now continually write characters or draw a picture. The frame selection unit 16 selects as the characteristic frame a frame within the target period during which the length of writing movements is equal to or above the threshold movement time length. If multiple participants move concurrently, the frame selection unit 16 detects the movement of each participant, and selects the characteristic frame based on the detection results. As in the first exemplary embodiment, the frame selection unit 16 may select as the characteristic frame the first frame, the last frame, the intermediate frame or a frame at any time point during the target period. The continuous movement time equal to or above the threshold movement time length indicates the possibility that active discussions are held in the meeting. The image of the frame during the target period may be an appropriate representative image that precisely represents the atmosphere of the meeting. The frame selection unit 16 thus selects the characteristic frame based on the movement count of the participant.

The object selection unit 17 selects as the characteristic object an object (a participant of the meeting) having the continuous movement time during the target period equal to or above the threshold movement time length. Since the continuous movement time during the target period equal to or above the threshold movement time length indicates the possibility that the contents of the movement are of greater value in the meeting, the object selection unit 17 selects the participant having performed that movement as the characteristic object.

In accordance with the second exemplary embodiment, the frame selection unit 16 selects as the characteristic frame the frame within the target period having the continuous movement time of the object equal to or above the threshold movement time length, and the object selection unit 17 selects the object having the continuous movement time during the target period equal to or above the threshold movement time length.

The textual information generation unit 18 generates the textual information indicating the contents of the movement of the characteristic object during the target period. In the same manner as in the first exemplary embodiment, the textual information generation unit 18 may generate the summary of the textual information or may highlight a particular word or character string.

In the same manner as in the first exemplary embodiment, the object selection unit 17 may select, as the movement and sound of the characteristic object, the movement and sound of each object during the target period, and the textual information generation unit 18 may generate the textual information indicating the movement and sound. Since the contents of the talk of another participant during the target period may be highly related to the contents of the movement of the characteristic object, the textual information related to the contents of talk of the other participant is also generated.

The display controller 19 causes the display 20 to display an image of the characteristic frame (representative image) and to display the textual information associated with each object on the representative image.

As described above, the representative image appropriately representing the atmosphere in the meeting room as an imaging target is selected by selecting the characteristic frame based on the movement time of the object. The information representing the movement of greater value is displayed on the representative image by selecting the characteristic object based on the movement time of each object, by generating the textual information representing the movement, and by displaying the textual information on the representative image. The mutually related information is displayed on the representative image by generating the textual information related to the movement and sound of each object during the target period and by displaying the textual information on the representative image. By referencing the representative image in the same manner as in the first exemplary embodiment, the user may easily learn an event occurring in the meeting during the target period.

Third Exemplary Embodiment

A third exemplary embodiment is described below. In the third exemplary embodiment, the frame selection unit 16 counts the number of talks an object (a participant of the meeting) who has continually performed (a consecutive talk count or a consecutive speech count), based on the audio data, identifies a period (target period) during which the consecutive talk count is equal to or above a predetermined threshold talk count, and selects a frame during the target period as the characteristic frame. The "consecutive talks" refer to a series of talks that are performed at intervals of a predetermined time length or shorter. If multiple participants talk concurrently, the frame selection unit 16 detects the talk of each participant, and selects the characteristic frame based on the detection results. As in the first exemplary embodiment, the frame selection unit 16 may select as the characteristic frame the first frame, the last frame, the intermediate frame or a frame at any time point during the target period. The consecutive talk count equal to or above the threshold consecutive talk count indicates the possibility that active discussions are held in the meeting. The image of the frame in the target period may be an appropriate representative image that precisely represents the atmosphere of the meeting. The frame selection unit 16 thus selects the characteristic frame based on the talk count of the participant.

The object selection unit 17 selects as the characteristic object an object (a participant of the meeting) having the consecutive talk count during the target period equal to or above the threshold consecutive talk count. Since the consecutive talk count during the target period equal to or above the threshold consecutive talk count indicates the possibility that the contents of the talk is of greater value in the meeting, the object selection unit 17 selects the participant having performed that talk as the characteristic object.

In accordance with the third exemplary embodiment, the frame selection unit 16 selects as the characteristic frame the frame within the target period in which the consecutive talk count of the object is equal to or above the threshold talk count, and the object selection unit 17 selects as the characteristic object the object having the consecutive talk count during the target period is equal to or above the threshold talk count.

The textual information generation unit 18 generates the textual information representing the contents of the talk based on the audio data representing the contents of the talk of the characteristic object during the target period. In the same manner as in the first exemplary embodiment, the textual information generation unit 18 may generate the summary of the textual information or may highlight a particular word or character string.

In the same manner as in the first exemplary embodiment, the object selection unit 17 may select as the movement and sound of the characteristic object as the movement and sound of each object during the target period, and the textual information generation unit 18 may generate the textual information indicating the movement and sound. Since the contents of talk of another participant during the target period may be highly related to the contents of the movement of the characteristic object, the textual information related to the contents of talk of the other participant is also generated.

The display controller 19 causes the display 20 to display an image of the characteristic frame (representative image) and to display the textual information associated with each object on the representative image.

As described above, the representative image appropriately representing the atmosphere in the meeting room as an imaging target is selected by selecting the characteristic frame based on the talk count of the object. The information representing the contents of the talk of greater value is displayed on the representative image by selecting the characteristic object based on the talk count of the object, by generating the textual information representing the contents of the talk, and by displaying the textual information on the representative image. The mutually related information is displayed on the representative image by generating the textual information related to the movement and sound of each object during the target period and by displaying the textual information on the representative image.

In the third exemplary embodiment, the representative image appropriately representing the atmosphere of the meeting room is selected, and the contents of the talk of the characteristic object are displayed on the representative image. By referencing the representative image, the user may easily learn the contents of the talk of the characteristic object occurring during the meeting. Since the information related to the contents of the talks of each participant, and the movement and sound of each participant and each thing occurring during the meeting is displayed on the representative image, the user may easily learn the contents of the talks of each participant, and the movement and sound of each participant occurring during the meeting. Without reproducing the moving image data from start to end, the user may easily learn events occurring during the meeting by simply referencing the representative image.

Fourth Exemplary Embodiment

A fourth exemplary embodiment is described below. In accordance with the fourth exemplary embodiment, the frame selection unit 16 measures a length of talk time (continuous talk time) throughout which an object (a participant of the meeting) continually talks, identifies a period (target period) in which the continuous talk time is equal to or above a predetermined threshold talk time, and selects a frame during the target period as a characteristic frame. The "continuous talk time" refers to a series of talks performed at intervals of a predetermined length or shorter and does not necessarily have to be a series of talks performed with virtually no time gap. If multiple participants talk concurrently, the frame selection unit 16 detects the talk of each participant, and selects the characteristic frame based on the detection results. As in the first exemplary embodiment, the frame selection unit 16 may select as the characteristic frame the first frame, the last frame, the intermediate frame or a frame at any time point during the target period. Since the continuous talk time equal to or above a predetermined threshold talk time indicates the possibility that the contents of the talk are of greater value, an image of the frame during the target period may be an appropriate representative image that precisely represents the atmosphere of the meeting. The frame selection unit 16 thus selects the characteristic frame based on the talk time of the participant.

The object selection unit 17 selects as the characteristic object an object (a participant of the meeting) having the continuous talk time in the target period equal to or above the threshold talk time. Since the length of the talk time during the target period equal to or above the threshold talk time value indicates the possibility that the contents of the talk are of greater value, the object selection unit 17 selects the participant having performed that talk as the characteristic object.

In accordance with the fourth exemplary embodiment, the frame selection unit 16 selects as the characteristic frame the frame within the target period having the continuous talk time equal to or above the threshold talk time, and the object selection unit 17 selects as the characteristic object the object having the continuous talk time during the target period equal to or above the threshold talk time.

The textual information generation unit 18 generates the textual information indicating the contents of the talk based on the audio data indicating the contents of the talk of the characteristic object in the target period. In the same manner as in the first exemplary embodiment, the textual information generation unit 18 may generate the summary of the textual information or may highlight a particular word or character string.

In the same manner as in the first exemplary embodiment, the object selection unit 17 may select as the movement and sound of the characteristic object the movement and sound of each object during the target period, and the textual information generation unit 18 may generate the textual information representing the movement and sound. Since the contents of the talk of another participant during the target period may be highly related to the contents of the talk of the characteristic object, the textual information related to the contents of the talk of the other participant is also generated.

The display controller 19 causes the display 20 to display an image of the characteristic frame (representative image) and to display the textual information associated with each object on the representative image.

As described above, the representative image appropriately representing the atmosphere in the meeting room as an imaging target is selected by selecting the characteristic frame based on the continuous talk time of the object. The information representing the contents of the talk of greater value is displayed on the representative image by selecting the characteristic object based on the continuous talk time of the object, by generating the textual information representing the contents of the talk, and by displaying the textual information on the representative image. The mutually related information is displayed on the representative image by generating the textual information related to the movement and sound of each object during the target period and by displaying the textual information on the representative image. By referencing the representative image in the same manner as in the third exemplary embodiment, the user may easily learn the event occurring in the conference room 100 during the target period.

Fifth Exemplary Embodiment

A fifth exemplary embodiment is described below. In accordance with the fifth exemplary embodiment, the frame selection unit 16 identifies a region (object) moving in the moving image data and detects an amount of movement of the object in accordance with detection results of the infrared camera. The frame selection unit 16 measures a length of time in which an amount of movement of an object is equal to or below a predetermined threshold amount of movement, identifies a period (target period) throughout which the length of time is equal to or above a predetermined threshold time length, and selects a frame within the target period. If multiple participants move concurrently, the frame selection unit 16 detects the movement of each participant, and selects the characteristic frame based on the detection results. As in the first exemplary embodiment, the frame selection unit 16 may select as the characteristic frame the first frame, the last frame, the intermediate frame or a frame at any time point during the target period. Since the amount of movement of the object is equal to or below the predetermined threshold amount of movement means that the movement of the object is smaller. As the small movement of the object becomes longer, the image of the frame during the target period may be more appropriately a representative image that represents the internal view of the meeting. For example, the smaller the movement of the participants A through D in the conference room 100 is, the longer the period of the movement is, and the more the image of the frame during the period fits as the representative image of the meeting. The frame selection unit 16 thus selects the characteristic frame based on the amount of movement of the participant.

The object selection unit 17 selects the characteristic object in accordance with at least one of the conditions including the continuous movement time, the consecutive talk count, and the continuous talk time.

In accordance with the first through fourth exemplary embodiments, the textual information generation unit 18 generates the textual information representing the contents of the movement and the contents of the talk of the characteristic object during the target period. The display controller 19 causes the display 20 to display an image of the characteristic frame (representative image) and to display the textual information associated with each object on the representative image.

As described above, the representative image appropriately representing the atmosphere in the meeting room as an imaging target is selected by selecting the characteristic frame based on the amount of the movement of the object. In the same manner as in the first through fourth exemplary embodiments, the user may easily learn the event in the conference room 100 during the target period by referencing the representative image.

As an example other than the first through fifth exemplary embodiments, the object selection unit 17 may select the characteristic object based on the contents of the talk of the object (the participant of the meeting) during the target period. For example, the object selection unit 17 may identify the loudness of a voice of an object based on the audio data, and may select as the characteristic object an object having a voice loudness higher than a predetermined threshold value. A voice having a higher loudness indicates that the contents of the talk are emphasized and suggests that the contents of the talk are of greater value. The participant having talked is thus selected as the characteristic object. Based on the audio data, the object selection unit 17 identifies the talking speed of each object, and selects as the characteristic object an object having a talking speed higher than a predetermined threshold value. A higher talking speed indicates the possibility that the contents of the talk are of greater value, and the object selection unit 17 selects as the characteristic object the participant who has talked. Based on the audio data, the object selection unit 17 identifies the intonation of the voice of each object, and may select the characteristic object with reference to the intonation.

The first through fifth exemplary embodiments may be used in combination. For example, the frame selection unit 16 may select the characteristic frame depending on one of the consecutive movement count, the continuous movement time, the consecutive talk count, the continuous talk time, and the amount of movement of the object, and the object selection unit 17 may select the characteristic object depending on one of the consecutive movement count, the continuous movement time, the consecutive talk count, and the continuous talk time.

Sixth Exemplary Embodiment

A sixth exemplary embodiment is described below. The object selection unit 17 selects the context information (key context information) in a co-occurrence relationship with the content information from the content information and the context information (the metadata) acquired in a time band specified by the user. An existing algorithm to perform the co-occurrence determination between two objects (algorithm to determine similarity between sets) is extended and applied to three objects. FIG. 6A illustrates coefficients in the co-occurrence relationship. As illustrated in FIG. 6A, A is content information, and B, C, and D are context information. |A| is the number of occurrences of the content information A, and |B|, |C|, and |D| are respectively the numbers of occurrences of the context information of B, C, and D. FIG. 6A illustrates also an example of the number of occurrences of combinations of the content information A, and the context information B, C, and D. The object selection unit 17 determines the co-occurrence intensity of the content information and the context information using Simpson's coefficient with threshold value expressed by the following Equation.

$$R(X, Y) = \begin{cases} \dfrac{|X \cap Y|}{\min(|X|, |Y|)} & \text{if } |X| > k \text{ and } |Y| > k, \\ 0 & \text{otherwise} \end{cases}$$

The Equation is based on the paper entitled "Social Network Extraction from the Web information", Transactions of the Japanese Society for Artificial Intelligence: AI, Vol. 20, pp. 46-56, 2005-11-01, Yutaka MATSUO, Hironori TOMOBE, Koichi HASHIDA, Hideyuki NAKASHIMA, and Mitsuru ISHIZUKA.

FIG. 6B illustrates an example of the coefficients representing the co-occurrence intensity. For comparison, FIG. 6B also illustrates the coefficients representing the co-occurrence intensity determined by using Simpson's coefficient and the coefficients representing the co-occurrence intensity determined by using Jaccard's coefficient. Simpson's coefficient is proportional to the correlation of X and Y. If X>>Y or X<<Y, keywords having not sufficiently higher relationship therebetween give rise to a higher value. A threshold value may be used to limit the co-occurrence intensity. The coefficient using the threshold value is Simpson's coefficient with threshold value represented by the Equation. Jaccard's coefficient represents the number of occurrences at which X and Y concurrently occur out of the occurrences of each of X or Y.

If Simpson's coefficient with threshold value is used, the context information having the highest co-occurrence intensity with respect to the content information A is the context information D as illustrated in FIG. 6B. In such a case, the object selection unit 17 selects the context information D as key context information.

Figure 7:
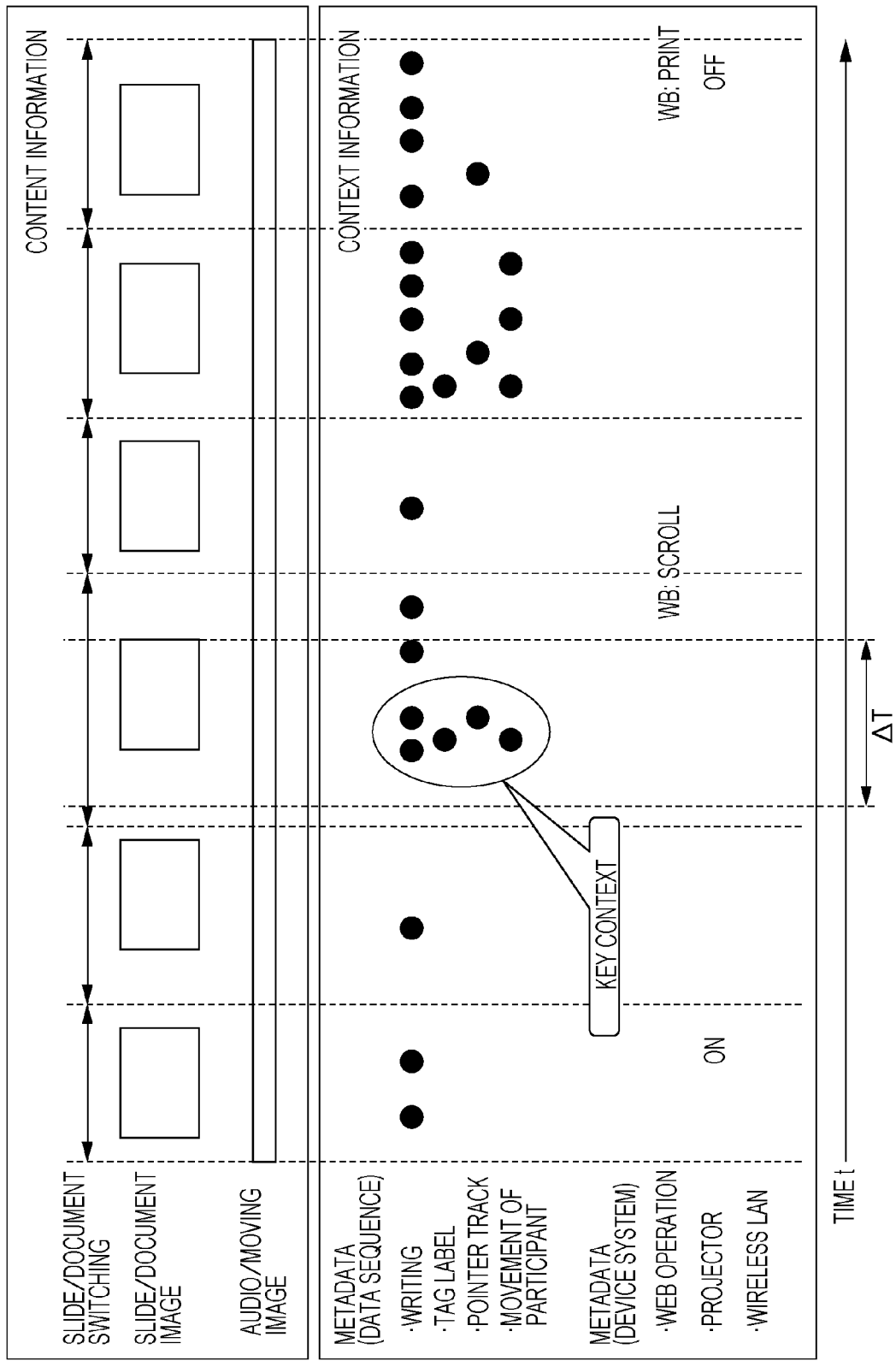
FIG. 7 illustrates another example of the content information and context information.

FIG. 7 illustrates an example of the key context information. The user may now use an operation unit (not illustrated) to specify any time band ΔT. The object selection unit 17 determines the coefficient of the co-occurrence intensity of the content information and the context information with reference to the content information and the context information acquired within the time band ΔT. As one example, the image data projected by the projector within the time band ΔT (data such as slide and document) is handled as the content information, and the object selection unit 17 selects the key context information having a high co-occurrence intensity with the content information. In the example of FIG. 7, the key context information includes data indicating the writing on the whiteboard 120, data indicating the sticking of the tag label, data representing the track of a pointer, and data representing the movement of the participant of the meeting. The object selection unit 17 selects these pieces of data. The frame selection unit 16 selects as the characteristic frame a frame within the time band ΔT from among multiple frames contained in the moving image data. Represented by the characteristic frame are an image projected by the projector (slide, document, and other image), and a variety of pieces of context information. Using the operation unit (not illustrated), the user may select any frame within the time band ΔT as the characteristic frame.

In accordance with the sixth exemplary embodiment, the textual information generation unit 18 generates the textual information related to the key context information. For example, the textual information generation unit 18 generates the textual information indicating the contents of the movement or the contents of the talk of the object represented by the key context information. The display controller 19 causes the display 20 to display the image (the representative image) of the characteristic frame and the textual information related to the key context information on the representative image.

As described above, mutually related information is displayed by selecting the context information in a co-occurrence relationship with the content information and by generating and displaying the textual information related to the context information. By referencing the representative image, the user may easily learn an event occurring in the conference room 100 during the target period.

Process Examples

Figure 8:
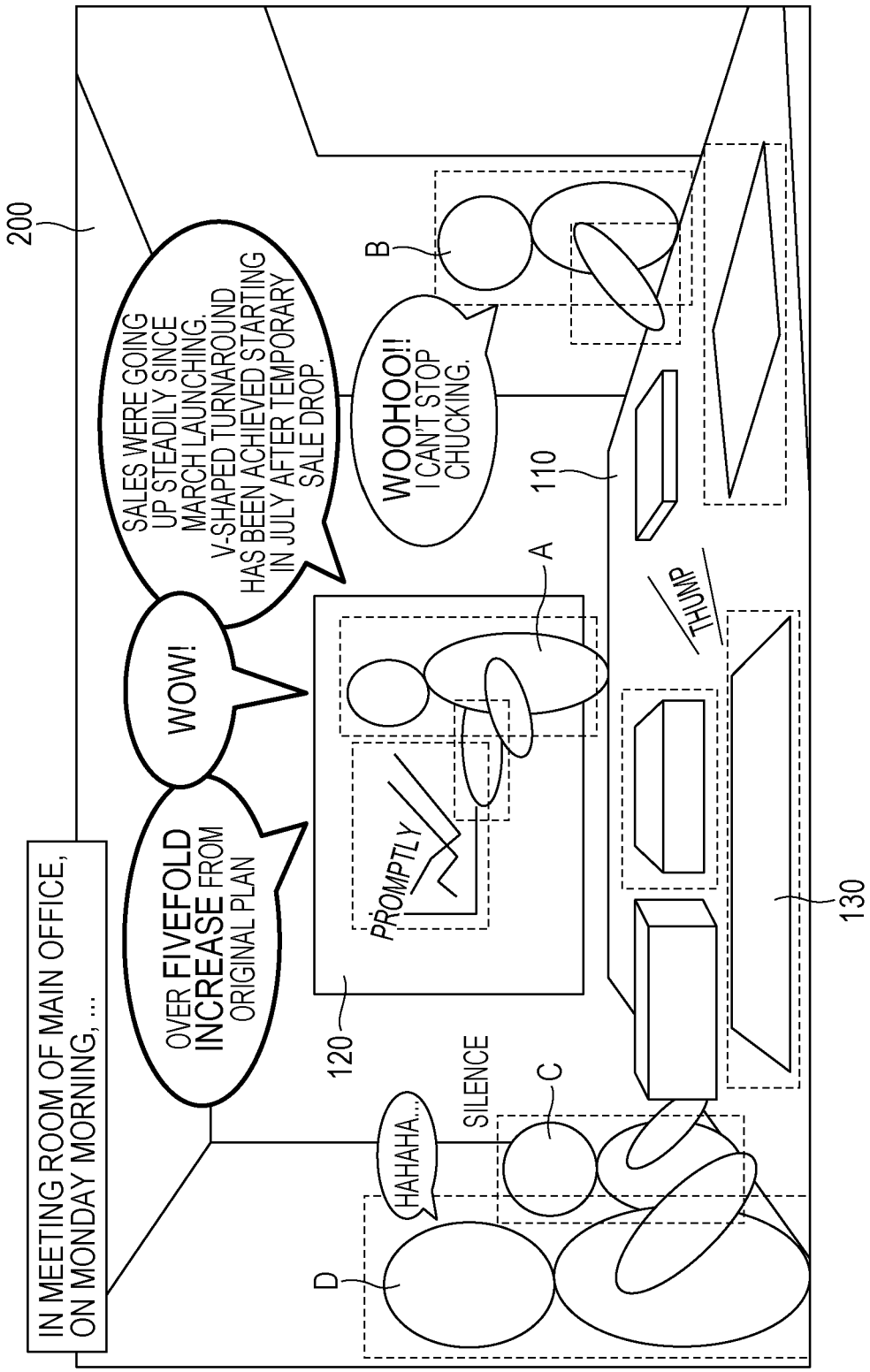
FIG. 8 diagrammatically illustrates an image of a scene of the meeting room.

Specific examples are described with reference to FIG. 8. FIG. 8 diagrammatically illustrates an example of an image of the characteristic frame. An image 200 indicates the inside view of the conference room 100 of FIG. 2, and is a representative image that is selected by the frame selection unit 16 as an image of the characteristic frame. For example, a participant A is writing characters and drawing a graph on the whiteboard 120 while participants B, C, and D are seated. Regions enclosed by broken-lined boxes in FIG. 8 are regions of interest (objects) detected by the infrared camera. A process of each of the first through sixth exemplary embodiments is described below.

The process example of each of the first and second exemplary embodiments is described. The process example of the first exemplary embodiment is described first. The participant A may now be writing characters and drawing a graph on the whiteboard 120. The frame selection unit 16 then counts the number of writings of the participant A who continually writes characters on the whiteboard 120, based on the detection results of the infrared camera. If the consecutive movement count of the participant A is equal to or above the threshold consecutive movement count, the frame selection unit 16 selects as the characteristic frame a frame within the target period in which the consecutive movement count is equal to or above the threshold consecutive movement count. In this way, an image of a scene in which the movement count of the participant A is relatively higher is selected as the representative image.

If the process example of the second exemplary embodiment is performed, the frame selection unit 16 measures time throughout which the participant A continuously writes characters or the like on the whiteboard 120. If the continuous movement time of the participant A is equal to or above the predetermined threshold continuous movement time, the frame selection unit 16 selects as the characteristic frame a frame within the target period in which the continuous movement time is equal to or above the predetermined threshold continuous movement time. In this way, an image of a scene in which an amount of movement of the participant A is relatively higher is selected as the representative image.

The object selection unit 17 selects as the characteristic object the participant A in accordance with the consecutive movement count or the continuous movement time of the object. The textual information generation unit 18 generates the textual information indicating the writing operation of the participant A (the character string "promptly"). The display controller 19 causes the display 20 to display the image 200 of the characteristic frame and further causes the textual information (the character string "promptly") in the region where the writing operation of the participant A is detected in the image 200. In the first exemplary embodiment, the textual information indicating the contents of the movement of the participant A having a relatively larger number of movements is displayed. In the second exemplary embodiment, the textual information indicating the contents of the movement of the participant A having a relatively higher amount of movements is displayed. Since the textual information indicates not the contents of the talk but the movement of the participant, the display controller 19 may display the textual information (the character string "promptly") with no balloon displayed.

The textual information generation unit 18 generates the textual information indicating the contents of the talk of the participant A during the target period. The display controller 19 arranges a balloon in a region that is close to the participant A and is external to the region where the object is displayed in the image 200 and the display controller 19 displays the textual information within the balloon. The display controller 19 may determine the size of the balloon based on the size of the region including the balloon, and may modify the size of the characters contained in the textual information in response to the size of the balloon. In accordance with the intonation of the voice of the participant A, the textual information generation unit 18 identifies a stressed word and then displays the word in color, a large font or a bold font. In the example of FIG. 8, the character strings "fivefold increase" and "Wow" are stressed words, and are thus displayed in color, a large font, or a bold font. The textual information generation unit 18 may generate the summary of the textual information indicating the contents of the talk of the participant A, and the display controller 19 may display the summary on the image 200. For example, the balloon may be unable to accommodate all the characters depending on the number of characters contained in the textual information. In such a case, the textual information generation unit 18 may generate the summary of the textual information.

The textual information generation unit 18 generates the textual information indicating the contents of the movement and the talk of each object during the target period, and the display controller 19 displays each piece of textual information with each object associated therewith on the image 200. For example, the textual information generation unit 18 generates the textual information of the contents of the talk of each of the participants B, C, and D during the target period based on the audio data of each of each of the participants B, C, and D. The display controller 19 arranges balloons in regions respectively close to the participants B, C, and D in the image 200, and display the textual information in the respective balloons. In this case, as well, the textual information generation unit 18 may display the stressed word in color, a large font, or a bold font based on the intonation of the voice of each of the participants B, C, and D. In the example of FIG. 8, the character string "Woohoo" in the contents of the talk of the participant B is displayed in a large font. The textual information generation unit 18 may generate the textual information to explain the situation of the participant C who remains silent during the target period (for example, a character string "Silence"). If a material 130 is moved during the target period, the textual information generation unit 18 generates the textual information to indicate the movement of the material 130 during the target period (a character string "Thump"). The display controller 19 arranges a balloon in a region close to the material 130 in the image 200, and displays the textual information in the balloon.

The textual information generation unit 18 acquires background information of the moving image data (information indicating time, date, and location), and then generates the textual information indicating the background information. The display controller 19 causes the textual information to be displayed on the image 200. FIG. 8 illustrates the textual information reading "In conference room of main office, on Monday morning, . . . ".

Displayed as an image is the image 200 that indicates the scene in which the participant whose movement count and amount of movement are relatively higher (more specifically, the scene in which the participant A is writing information on the whiteboard 120). A scene of the meeting in which a movement of greater value might take place is thus displayed on the image 200.

The textual information indicating the contents of the talks of the participants A through D during the target period and the textual information indicating the contents of the movement of another object are generated and then displayed on the image 200. The user may thus easily learn the contents of the talks of the participants A through D, and the movement and sound of the other object, performed while the participant A is writing the information on the whiteboard 120. By referencing the image 200, the user may easily learn the events (the talks of the participants A through D and the movement and sound of the other object) occurring while the participant A is writing the information on the whiteboard 120. As illustrated in FIG. 8, the contents of the talks of the participants A through D are displayed on the image 200. The user may thus easily learn the relationship among the contents of the talks of the participants A through D. Particularly, taking a look at the participants A and B who talk more frequently, the user may easily understand the relationship between the contents of the talk of the participant A and the contents of the talk of the participant B. By referencing the image 200, a person who has not participated in the meeting may easily understand word exchanging among the participants, the contents of the talk of each participant, and the events occurring during the meeting.

Since the textual information related to each object is displayed on the image 200, the image 200 may serve as the minutes of the meeting. Drafting the minutes of the meeting becomes an unnecessary task.

The process example of each of the third and fourth exemplary embodiments is described below. The process example of the third exemplary embodiment is described first. Using the audio data, the frame selection unit 16 counts the number of talks the participant A continually performs. If the consecutive talk count of the participant A is equal to or above the threshold consecutive talk count, the frame selection unit 16 selects as the characteristic frame a frame within the target period in which the consecutive talk count of the participant A is equal to or above the threshold consecutive talk count. An image of a scene in which the talk count of the participant A is relatively higher is selected as the representative image.

In the process example of the fourth exemplary embodiment, the frame selection unit 16 measures time throughout which the participant A continuously talks. If the continuous talk time of the participant A is equal to or above the threshold continuous talk time length, the frame selection unit 16 selects as the characteristic frame a frame within the target period in which the continuous talk time is equal to or above the threshold continuous talk time length. An image of a scene in which an amount of talk of the participant A is relatively higher is selected as the representative image.

The object selection unit 17 selects the participant A as the characteristic object in accordance with the consecutive talk count or the continuous talk time of the object. The textual information generation unit 18 generates the textual information indicating the contents of the talk of the participant A. The display controller 19 causes the display 20 to display the image 200 of the characteristic frame. The display controller 19 further arranges a balloon in a region that is close to the participant A and external to the region where the object is displayed in the image 200, and the display controller 19 displays the textual information within the balloon. In the third exemplary embodiment, the textual information indicating the contents of the talk of the participant A having a relatively higher talk count is displayed. In the fourth exemplary embodiment, the textual information indicating the contents of the talk of the participant A having a relatively higher amount of talk is displayed.

The textual information generation unit 18 generates the textual information indicating the contents of the movement of the participant A during the target period (the character string "promptly"), and the display controller 19 displays the textual information in the region of the image 200 where the writing operation of the participant A is detected. The textual information generation unit 18 further generates the textual information indicating the contents of the talks of the other participants B through D during the target period, and the textual information indicating the contents of the movement of the material 130, and the display controller 19 displays the textual information on the image 200.

The image 200 representing the scene of the talk of the participant A having a relatively higher talk count or a relatively more talk amount is displayed as the representative image. The scene of the meeting in which the talk of greater value is possibly performed is displayed on the image 200.

The textual information indicating the contents of the talks of the participants B through D during the target period and the textual information indicating the contents of the movement of another object are generated and then displayed on the image 200. The user may thus easily learn the contents of the talks of the participants B through D, and the movement and sound of the other object, performed while the participant A is talking. By referencing the image 200, the user may easily learn the events (the talks of the participants B through D and the movement and sound of the other object) occurring while the participant A is talking. As with the process examples of the first and second exemplary embodiments, the user may easily learn the relationship among the contents of the talks of the participants A through D.

The process example of the fifth exemplary embodiment is described below. Using the detection results of the infrared camera, the frame selection unit 16 measures the length of time during which an amount of movement of an object is equal to or below a threshold movement threshold value, and selects as the characteristic frame a frame within the target period having the length of time equal to or above the threshold time length. The textual information generation unit 18 generates the textual information indicating the contents of the talks of the participants A through D during the target period, and the textual information indicating the movement and sound of another object. As in the first through fourth exemplary embodiments, the display controller 19 causes the display 20 to display the image 200 of the characteristic frame, and the textual information on the image 200. The fifth exemplary embodiment provides the same advantages as those of the first through fourth exemplary embodiments.

The process example of the sixth exemplary embodiment is described below. The frame selection unit 16 selects as the characteristic frame a frame included in the time band specified by the user. The object selection unit 17 selects from among the content information and the context information, acquired during the time band, the context information in a co-occurrence relationship with the content information, and multiple pieces of the context information mutually in a co-occurrence relationship. The object selection unit 17 determines the coefficients of the co-occurrence intensities of the contents of the talks and the contents of the movements from among the contents of the talks and the contents of the movements of the participants A through D, and selects multiple contents of talks and movements having the coefficients of co-occurrence intensity equal to or above a threshold value. For example, if the coefficient of co-occurrence intensity between the contents of the talk of the participant A and the contents of the talk of the participant B is equal to or above the threshold value, the object selection unit 17 selects the contents of the talk of the participant A and the contents of the talk of the participant B, and the textual information generation unit 18 generates the textual information indicating the contents of the talk of the participant A and the textual information indicating the contents of the talk of the participant B. The display controller 19 causes the display 20 to display the image 200 and the textual information indicating the contents of the talks of the participants A and B on the image 200.

The user may easily learn the contents of the talks in mutually co-occurrence relationship by displaying on the image 200 the textual information of the contents of the talks of the participants A and B in the co-occurrence relationship.

The exemplary embodiments have been described with the objects (persons and things) handled as a target in the conference room 100. The scene to which the exemplary embodiments are applied is not limited to the inside of the meeting room. For example, the exemplary embodiments are applicable to a scene in which a single person makes a public speech, or a scene of an accident. For example, the information processing apparatus 10 may select the characteristic frame and the characteristic object from the moving image data and the audio data storing the contents of the public speech, and may display the textual information in the image of the characteristic frame. In this way, a stressed portion of the public speech, or an event occurring in the middle of the public speech may be displayed on the representative image. By referencing the representative image, a summary of the public speech may be easily understood. If the moving image data and the audio data storing the scene of an accident are handled, the textual information may be displayed on the characteristic frame. The scene at the moment of the accident may be displayed on the representative image. The information processing apparatus 10 may handle the moving image data and the audio data captured by a monitoring camera, and may display the textual information on the image of the characteristic frame. In this way, the scene of an event occurring in an imaging area of the monitoring camera is displayed on the representative image. By referencing the representative image, the user may easily learn the scene at the moment of the event without reproducing the moving image data captured by the monitoring camera.

The information processing apparatus 10 may be implemented by a hardware resource that operates in concert with software. More specifically, the information processing apparatus 10 includes a processor, such as a central processing unit (CPU). The processor reads a program from a memory (not illustrated), and executes the program. The processor thus executes the functions of the data acquisition unit 11, the data extractor 12, the data analyzer 14, the image analysis unit 15, the frame selection unit 16, the object selection unit 17, the textual information generation unit 18, and the display controller 19. The program may be stored using a non-transitory recording medium, such as a compact disk (CD) or a digital versatile disk (DVD), or a communication medium, such as a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a frame selection unit that selects a characteristic frame from image data representing one or a plurality of objects and including a plurality of frames;
an object selection unit that selects a characteristic object from the one or the plurality of objects;
a textual information generation unit that generates textual information that indicates at least one of a movement of the characteristic object and a sound from the characteristic object; and
a display controller that displays an image of the characteristic frame with the textual information associated with the characteristic object,
wherein the frame selection unit selects the characteristic frame in a period within which an amount derived from a movement of the one or the plurality of objects or derived from the sound from the one or the plurality of objects is equal to or above a predetermined threshold value.

2. The information processing apparatus according to claim 1, wherein the frame selection unit selects as the characteristic frame a frame in a period within which a movement count of the movements of the one or the plurality of objects is equal to or above a predetermined threshold movement count.

3. The information processing apparatus according to claim 1, wherein the frame selection unit selects as the characteristic frame a frame in a period within which a length of time of the movement of the one or the plurality of objects is equal to or above a predetermined threshold movement time length.

4. The information processing apparatus according to claim 1, wherein the frame selection unit selects as the characteristic frame a frame in a period within which a talk count of talks performed by the one or the plurality of objects is equal to or above a predetermined threshold talk count.

5. The information processing apparatus according to claim 1, wherein the frame selection unit selects as the characteristic frame a frame in a period within which a length of time of a talk performed by the one or the plurality of objects is equal to or above a predetermined threshold talk time length.

6. The information processing apparatus according to claim 1, wherein the frame selection unit selects as the characteristic frame a frame in a period within which a length of time throughout which an amount of movement of the one or the plurality of objects is equal to or below a predetermined threshold movement amount is equal to or above a predetermined threshold time length.

7. The information processing apparatus according to claim 1, wherein the object selection unit selects the characteristic object in accordance with the movement of the one or the plurality of objects or the sound from the one or the plurality of objects.

8. The information processing apparatus according to claim 7, wherein the object selection unit selects as the characteristic object an object having a movement count equal to or above a predetermined threshold movement count from the one or the plurality of objects, and
wherein the textual information generation unit generates the textual information indicating the movement of the characteristic object having the movement count equal to or above the predetermined threshold movement count.

9. The information processing apparatus according to claim 7, wherein the object selection unit selects as the characteristic object an object having a length of time of the movement equal to or above a predetermined threshold movement time length from the one or the plurality of objects, and
wherein the textual information generation unit generates the textual information indicating contents of the movement.

10. The information processing apparatus according to claim 7, wherein the object selection unit selects as the characteristic object an object having a talk count of talks equal to or above a predetermined threshold talk count from the one or the plurality of objects, and
wherein the textual information generation unit generates the textual information indicating contents of the talks of the characteristic object having the talk count of the talks equal to or above the predetermined threshold talk count.

11. The information processing apparatus according to claim 7, wherein the object selection unit selects as the characteristic object an object having a length of time of a talk equal to or above the predetermined threshold talk time length from the one or the plurality of objects, and
wherein the textual information generation unit generates the textual information indicating contents of the talk.

12. The information processing apparatus according to claim 7, wherein the object selection unit selects the characteristic object in accordance with contents of the talk of each of the one of the plurality of objects, and
wherein the textual information generation unit generates the textual information indicating contents of the talk.

13. The information processing apparatus according to claim 12, wherein the object selection unit selects the characteristic object in accordance with a magnitude of a voice of the talk or a speed of the talk of each of the one or the plurality of objects.

14. The information processing apparatus according to claim 1, wherein the object selection unit selects as a movement or a sound of the characteristic object a movement or a sound of mutually related objects from among movements of the plurality of objects or sounds of the plurality of objects, and
wherein the textual information generation unit generates the textual information indicating the movement or the sound of the characteristic object.

15. The information processing apparatus according to claim 14, wherein the object selection unit selects as a movement or a sound of the characteristic object a movement or a sound of objects in a co-occurrence relationship from among movements of the plurality of objects or sounds of the plurality of objects.

16. The information processing apparatus according to claim 14, wherein the object selection unit selects a movement or a sound of the characteristic object from movements or sounds of objects in a predetermined time band.

17. The information processing apparatus according to claim 1, wherein the object selection unit selects as a movement of the characteristic object a movement of an object having a movement count of movements equal to or above a predetermined threshold movement count from the one or the plurality of objects, and selects a movement or a sound of another object during a time band throughout which the movements of the movement count equal to or above the predetermined threshold movement count are performed, wherein the textual information generation unit generates the textual information indicating the movement of the characteristic object and the textual information indicating the movement or the sound of the other object, and wherein the display controller displays an image of the characteristic frame with the textual information corresponding to each object associated with the object.

18. The information processing apparatus according to claim 1, wherein the object selection unit selects as a speech of the characteristic object a talk of an object having a length of time of the talk equal to or longer than a predetermined threshold talk time length, and selects a movement or a speech of another object in a time band throughout which the talk having the time length equal to or longer than the predetermined threshold talk time length is performed, wherein the textual information generation unit generates the textual information indicating contents of the speech of the characteristic object and generates the textual information indicating contents of the movement or contents of the speech of the other object, and wherein the display controller displays an image of the characteristic frame with the textual information corresponding to each object associated with the object.

19. The information processing apparatus according to claim 1, wherein the display controller displays the textual information, with the characteristic object associated with the textual information, in a region external to a region where the characteristic object is displayed in the image of the characteristic frame.

20. The information processing apparatus according to claim 1, wherein the display controller changes a manner of displaying the textual information in accordance with a type of the characteristic object.

21. The information processing apparatus according to claim 1, wherein the textual information generation unit generates a summary of the textual information, and wherein the display controller display the summary in the image of the characteristic frame.

22. A method of an information processing apparatus, comprising:

selecting a characteristic frame from image data representing one or a plurality of objects and including a plurality of frames;

selecting a characteristic object from the one or the plurality of objects;

generating textual information that indicates at least one of a movement of the characteristic object and a sound from the characteristic object; and displaying an image of the characteristic frame with the textual information associated with the characteristic object, wherein the selecting the characteristic frame comprises selecting the characteristic frame in a period within which an amount derived from a movement of the one or the plurality of objects or derived from the sound from the one or the plurality of objects is equal to or above a predetermined threshold value.

23. A non-transitory computer readable medium storing a program causing a computer to execute a process for displaying an image, the process comprising:

selecting a characteristic frame from image data representing one or a plurality of objects and including a plurality of frames;

selecting a characteristic object from the one or the plurality of objects;

generating textual information that indicates at least one of a movement of the characteristic object and a sound from the characteristic object; and displaying an image of the characteristic frame with the textual information associated with the characteristic object, wherein the selecting the characteristic frame comprises selecting the characteristic frame in a period within which an amount derived from a movement of the one or the plurality of objects or derived from the sound from the one or the plurality of objects is equal to or above a predetermined threshold value.

\* \* \* \* \*